U S007095486B2

United States Patent
Greco

(10) Patent No.: US 7,095,486 B2
(45) Date of Patent: *Aug. 22, 2006

(54) LASER TRANSMITTER WITH THERMALLY INDUCED ERROR COMPENSATION AND METHOD OF TRANSMITTER COMPENSATION

(75) Inventor: J. David Greco, Yellow Springs, OH (US)

(73) Assignee: Trimble Navigation Limited, Sunnyvale, CA (US)

( * ) Notice: Subject to any disclaimer, the term of this patent is extended or adjusted under 35 U.S.C. 154(b) by 8 days.

This patent is subject to a terminal disclaimer.

(21) Appl. No.: 10/622,563

(22) Filed: Jul. 18, 2003

(65) Prior Publication Data

US 2005/0073672 A1 Apr. 7, 2005

Related U.S. Application Data

(63) Continuation of application No. 10/042,982, filed on Jan. 9, 2002, now Pat. No. 6,621,560.

(51) Int. Cl.
G01C 3/08 (2006.01)
G01C 9/06 (2006.01)
G01C 15/10 (2006.01)

(52) U.S. Cl. ............... 356/4.01; 356/4.08; 33/366.21; 33/366.22

(58) Field of Classification Search ........ 356/4.01–4.1; 73/291–295; 33/365, 366.11, 366.13, 366.18, 33/366.21, 366.22, 397
See application file for complete search history.

(56) References Cited

U.S. PATENT DOCUMENTS 4,062,634 A 12/1977 Rando et al.
4,779,353 A * 10/1988 Lopes et al. ............ 33/315
4,914,593 A 4/1990 Middleton et al.
4,918,608 A 4/1990 Middleton et al.
4,924,374 A 5/1990 Middleton et al.
5,146,688 A 9/1992 Ito
5,184,293 A 2/1993 Middleton et al.
5,235,511 A 8/1993 Middleton et al.
5,656,934 A 8/1997 Bosselmann
5,689,330 A 11/1997 Gerard et al.
5,764,046 A 6/1998 Bosselmann
5,844,928 A 12/1998 Shastri et al.
5,852,493 A 12/1998 Monnin
6,055,046 A 4/2000 Cain
6,121,627 A 9/2000 Tulip
6,621,560 B1 * 9/2003 Greco ................. 356/4.08

* cited by examiner

Primary Examiner—Thomas H. Tarcza
Assistant Examiner—Isam Alsomiri
(74) Attorney, Agent, or Firm—Dinsmore & Shohl LLP

(57) ABSTRACT

The transmitter for projecting a beam of laser light includes a source of a beam of laser light, and a projection arrangement for directing the beam of laser light at a selected grade. The transmitter further includes a temperature sensor for detecting the temperature of said transmitter, and a temperature correction circuit, including a look-up table, responsive to said temperature sensor, for adjusting said projection arrangement in dependence upon offset grade values that are stored in said look-up table for a plurality of transmitter temperatures. These offset grade values are separately determined on an empirical basis for each transmitter, such that temperatures induced errors in the direction of the beam of laser light are compensated.

16 Claims, 6 Drawing Sheets

LASER TRANSMITTER WITH THERMALLY INDUCED ERROR COMPENSATION AND METHOD OF TRANSMITTER COMPENSATION

CROSS REFERENCE TO RELATED APPLICATION

This is a continuation application of application Ser. No. 10/042,982 filed on Jan. 09, 2002 now U.S. Pat. No. 6,621,560 entitled "LASER TRANSMITTER WITH THERMALLY INDUCED ERROR COMPENSATION AND METHOD OF TRANSMITTER COMPENSATION".

BACKGROUND OF THE INVENTION

The present invention relates to an improved laser transmitter and, more particularly, to a laser transmitter and method of laser transmitter compensation in which thermally induced errors in the grade of the projected beam of laser light are reduced by monitoring the transmitter temperature and correcting the transmitter operation accordingly.

Laser transmitters are commonly used in surveying and in the construction industry for measuring or checking elevations, grade, dimensions from off-set lines, and the like. It is well known, for example, to use a laser beam transmitter in place of the level instrument. At the location where elevation is to be measured or checked, a target or laser beam detector is employed to intercept the laser beam from the transmitter. The laser transmitter includes rotating optical components which produce a beam that sweeps in a generally horizontal plane. Some such transmitters incorporate visually readable level vials and manually adjustable screw mechanism to permit the transmitter to be oriented so that the plane defined by the beam is level or is tilted in a desired direction at a desired grade.

While such systems provide many improvements over the conventional level and rod survey equipment, they also present certain disadvantages and limitations. For example, the degree of accuracy in establishing a horizontal beam plane is dependent on the operator's skill and judgement in reading the level vials as he operates the adjusting screws. Moreover, where the operator moves away from the device to tend the target or a beam detector, the laser beam transmitter can move out of level adjustment, as from being jarred, without the operator's knowledge so that subsequent measurements are erroneous.

A laser transmitter having significant advantages over earlier prior art devices is shown in U.S. Pat. No. 4,062,634, issued Dec. 13, 1977, to Rando et al, which is commonly assigned with the present application. The system disclosed in the Rando et al patent is one in which orientation of the laser beam reference plane is accomplished automatically. A support frame for the laser source is pivotally mounted on the base frame of the Rando et al device. The support frame carries electrical sensor vials which sense the orientation of the support frame and provide electrical signals used by a feedback control system. The feedback control system activates electric motors to move the support frame into a position in which the vials are leveled. The vials are mounted on the support frame in such a manner that their positions may be adjusted by separate grade motors. When the reference laser plane is to be oriented at an angle to the horizontal, at least one grade motor is actuated by the operator to tilt a vial with respect to the support frame. The feedback control system then reorients the support frame to bring the vial back into its level position, tilting the frame by the desired amount. Other laser transmitters that incorporate level vials to detect orientation of transmitter components are shown in U.S. Pat. No. 5,852,493, issued Dec. 22, 1998, to Monnin, and in U.S. Pat. No. 6,055,046, issued Apr. 25, 2000, to Cain.

While providing a significant improvement over the prior art, it has been found that laser transmitters of this type may experience significant errors as a result of changes in ambient temperature. It has been found that a major source of these temperature induced errors are the level vials. A level vial of the type used in such transmitters typically comprises an electrically nonconductive vial casing, usually made of glass, that defines an elongated, arcuate chamber which curves generally downward toward its opposite ends. A quantity of electrically conductive fluid is provided in the chamber. Such a fluid may, for example, have a ketone component. A pair of end electrodes electrically communicate with the upper portions of the chamber adjacent its opposite ends and extend toward the central portion of said chamber. A common electrode extends the entire length of the chamber along its lower surface. The quantity of electrically conductive fluid in the chamber is such that an air bubble is left in the chamber, rising to whatever portion of the chamber is uppermost. It will be appreciated that, as the vial is tilted in one direction, the electrical impedance of a path from one end electrode through the electrically conductive fluid to the common electrode will increase, while the electrical impedance of a path from the other end electrode to the common electrode will decrease. When the vial is tilted in the opposite direction, the end-electrode-to-common-electrode impedances change in the opposite fashion. When the two end-electrode-to-common-electrode impedances are equal, the vial can be said to be oriented horizontally. It will be appreciated, however, that other impedance ratios might be defined as horizontal, if desired.

In any event, changes in the ambient temperature of a vial may cause the vial casing to change dimensions and shape. Of particular concern is any asymmetric change in the shape of the chamber, in that this may result in a change in the position of the air bubble and a change in the impedance ratio without any actual change in vial orientation. Vials have, in the past, been thermally insulated. While this reduces short term temperature fluctuations and temperature gradients along the length of the vial, it does not reduce errors stemming from asymmetric changes in chamber shape. A need exists for a laser transmitter in which such errors are eliminated, or at least minimized.

SUMMARY OF THE INVENTION

This need is met by a transmitter for projecting a beam of laser light and a method according to the present invention in which thermally induced errors are compensated. The transmitter includes a source of laser light, a projection arrangement for directing the laser light at a selected grade, a temperature sensor, and a temperature correction circuit. The projection arrangement includes a level vial which provides an electrical signal indicating that the laser light is being projected at the selected grade. The temperature sensor detects the temperature of the vial. The temperature correction circuit is responsive to the temperature sensor, and adjusts the projection arrangement such that temperature induced errors in the direction of the beam of laser light are compensated, and the beam of laser light is directed substantially at the selected grade.

The level vial comprises an electrically nonconductive vial casing defining an elongated chamber which curves generally downward toward opposite ends thereof, a quantity of electrically conductive fluid in the chamber, a pair of end electrodes electrically communicating with the upper portions of the chamber adjacent opposite ends and extending toward the central portion of the chamber, and a common electrode electrically communicating with the lower portion of the chamber. The vial is presumed to be level when resistances measured at each end are equal. The magnitudes of these resistances change with temperature, thus providing an indication of temperature. The temperature sensor circuit includes a current sensor circuit for sensing the resistivity provided by the electrically conductive fluid. The current sensor circuit includes a test resistance connected to one of the end electrodes, and a test circuit for determining the voltage across the test resistance. A test signal of predetermined voltage and short duration is applied across the end electrodes of the level vial and the voltage across the test resistance is measured. This measured voltage across the test resistance is an indication of the level of current through the level vial and this, in turn, is a function of vial temperature. In other words, the temperature of the vial is detected by detecting the bulk resistivity of the electrically conductive fluid in the vial.

The projection arrangement for directing the laser light at a selected grade may include an arrangement for changing the direction of the beam until the selected grade is reached, as indicated by the level vial electrical signal. The temperature correction circuit may include a circuit for providing an offset grade value to the arrangement for changing the direction of the beam. The circuit for providing an offset grade value to the arrangement for changing the direction of the beam may include a look-up table having offset grade values associated with specific temperature ranges. Preferably the look-up table may have offset grade values associated with two specific temperature ranges. These offset grade values are unique to the specific transmitter.

The projection arrangement may include a rotating optical element for directing the laser light in a rotating beam. The projection arrangement may also include first and second level vials, the first level vial providing an electrical signal indicating that the laser light is being projected at a selected grade in a first direction, and the second level vial providing an electrical signal indicating that the laser light is being projected at a selected grade in a second direction, orthogonal to the first direction. The first and second level vials may each comprise an electrically nonconductive vial casing defining an elongated chamber which curves generally downward toward opposite ends thereof, a quantity of electrically conductive fluid in the chamber, a pair of end electrodes electrically communicating with the upper portions of the chamber adjacent opposite ends and extending toward the central portion of the chamber, and a common electrode electrically communicating with the lower portion of the chamber. The temperature sensor may include a current sensor circuit for sensing the resistivity of the electrically conductive fluid in both of the first and second level vials. The current sensor circuit may include a test resistance connected to one of the end electrodes of each of the first and second vials, and a test circuit for determining the voltage across the test resistance in response to the application of a test signal of predetermined voltage and short duration across the parallel connected end electrodes of the first and second level vials.

The method of calibrating the transmitter comprises the steps of: a.) selecting a plurality of temperatures at which correction will be made; b.) subjecting the transmitter to an ambient temperature equal to the first temperature for a period sufficient to achieve thermal equilibrium and bring the level vial to the ambient temperature; c.) setting the transmitter at a specified grade; d.) measuring the actual grade of the laser; e.) determining the error in the grade achieved; f.) determining the grade offset needed to correct for the measured error; g.) measuring the temperature of the vial at that ambient temperature; h) storing the grade offset and the corresponding vial temperature for the first temperature in a look-up table; and i.) repeating steps a.) through h.) for each of the others of the plurality of temperatures. The step of selecting a plurality of temperature for which correction will be made includes the step of selecting three temperatures.

Accordingly, it is an object of the present invention to provide a laser beam transmitter which corrects effectively for thermally induced grade errors; to provide such a transmitter in which the temperature of the transmitter is assessed by monitoring the resistivity of a level vial that forms a part of the projection arrangement of the transmitter; to provide such a transmitter in which the correction is effected through grade offset values that are stored in a look-up table and that are unique to the errors of the specific transmitter; and to provide a method of compensating such a laser beam transmitter in which grade offset values are determined specifically for the transmitter of interest and stored in a look-up table. Other objects will be apparent from reference to the accompanying description and claims.

DETAILED DESCRIPTION OF THE INVENTION

Figure 1:
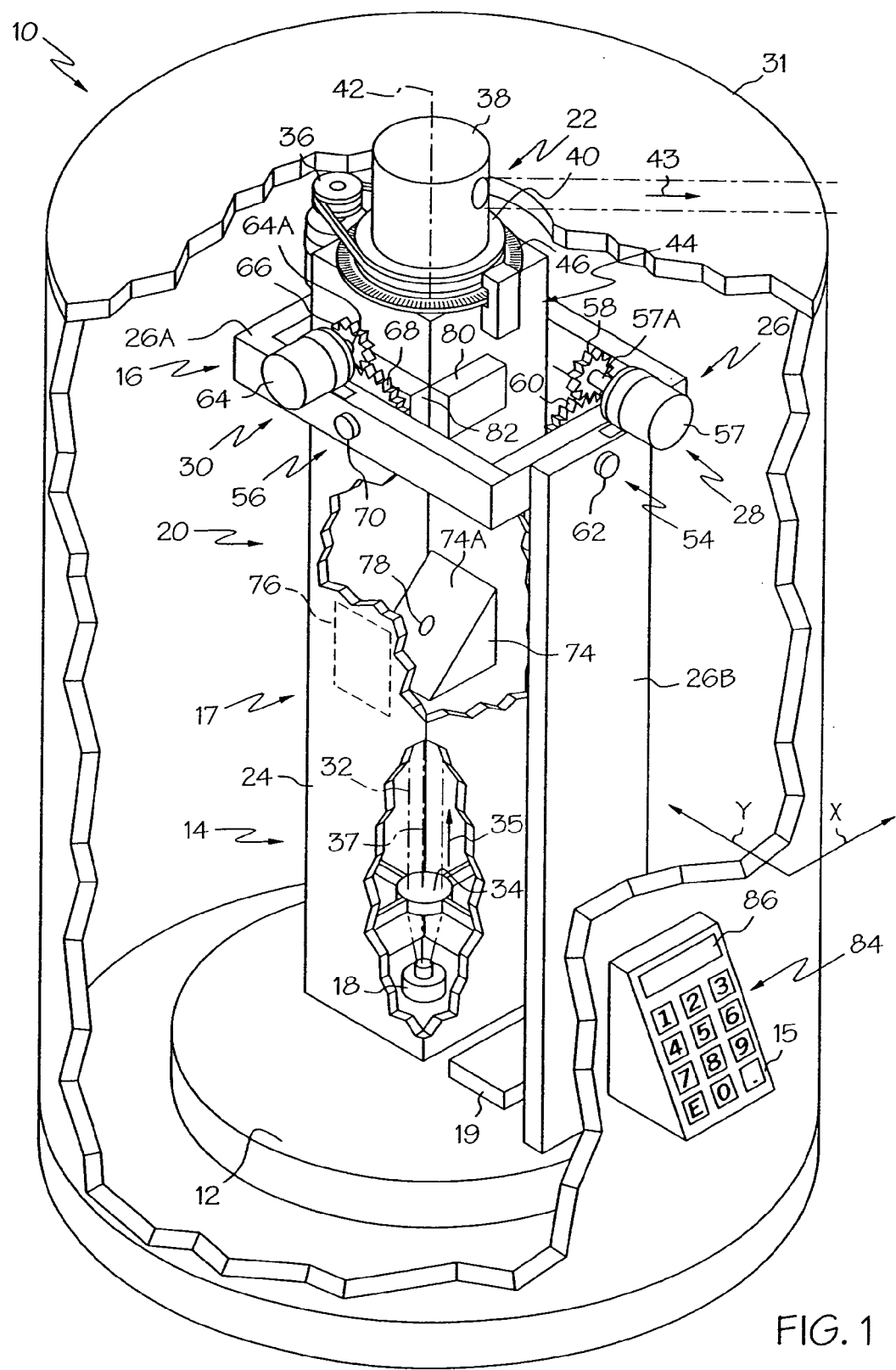
FIG. 1 is a perspective view of a laser transmitter according to the present invention, with portions broken away to reveal internal structure.

While the present invention is applicable in general to laser transmitters, it will be described herein with reference to a laser transmitter 10 illustrated in FIG. 1. The laser transmitter 10 includes a base 12, a projection arrangement 14, an input device 15, a positioning device 16, and a processor and temperature correction circuit 19. The transmitter 10 includes a source of laser light 18, which cooperates with an optical assembly 20 and an optical projecting device 22. The optical assembly 20 includes a frame 24 and a gimbal mechanism 26. The positioning device 16 comprises a first positioning device 28 and a second positioning device 30. The laser transmitter 10 also includes a cover 31 to enclose and protect the internal components of the transmitter.

The laser light source 18 is coupled to the frame 24 and generates a beam 32. In the illustrated embodiment, the light source 18 is a laser diode. It will be appreciated by those skilled in the art, however, that other laser devices may be used to generate the beam of laser light 32. A collection lens 34 is coupled to the frame 24 and positioned above the light source 18 so as to collect the laser beam 32 and project it in the first direction 35 along a substantially vertical axis 37. Preferably, the collection lens 34 is a planar convex lens which collimates the laser beam 32. The projection arrangement 14 may comprise additional components, such as a steering window, to ensure that the laser beam 32 is projected along the axis 37, or an aperture to improve image quality, as desired.

The optical projecting device 22 is coupled to the frame 24 and includes a motor 36 and a pentaprism 38 within the spindle 40. The optical projecting device 22 deflects the laser beam 32 ninety degrees such that it emerges in a direction 43. The pentaprism 38 is an optical element that is rotated to direct the laser light in a rotating beam. The pentaprism 38 is a structure which deflects incoming light at a ninety-degree angle with respect to the direction of the incoming light, within limits, regardless of the precise orientation of the pentaprism 38. Consequently, the orientation of the pentaprism can fluctuate slightly due to bearing tolerances and other reasons without the operation of the transmitter being significantly affected.

The pentaprism 38 is rotated with spindle 40 by the motor 36 at a speed of approximately 600 rpm to define a plane of light. The laser beam 32 is rotated along an arc defined about a central rotational axis 42. The central rotational axis 42 corresponds to the center of rotation of the pentaprism 38. The rotational arc is preferably 360 degrees; however, it will be appreciated by those skilled in the art that the laser beam 32 may be dithered back and forth, defining a rotational arc of less than 360 degrees. A speed of 600 rpm is well suited for machine control applications of the laser beam 32; however, the pentaprism 38 may be rotated at any speed desired, depending upon the manner in which the transmitter is used. While a pentaprism is used in the illustrated embodiment to deflect the incoming light, other light deflecting devices, such as a pentamirror, mirror, prism, reflector or refractor may also be used. Further, while the laser transmitter 10 has been described with the laser beam 32 being transmitted initially upwards, it will be appreciated by those skilled in the art that various optical components may be shifted appropriately so that the laser beam 32 is transmitted downwards, with the optical projecting device 22 being the lower most component and the light source 18 being the upper most component.

The frame 24 is coupled to a first portion 26A of the gimbal mechanism 26 through a second or Y-axis pivot 56. The first portion 26A is coupled to a second portion 26B of the gimbal mechanism 26 through a first or X-axis pivot 54. In the illustrated embodiment, the first and second axes are substantially orthogonal to each other and correspond to the X and Y axes, respectively, of a standard X-Y coordinate system. The first and second axes, referenced hereafter as the X and Y axes, respectively, are therefore fixed relative to the transmitter 10.

The second portion 26B of the gimbal mechanism 26 is coupled to the base 12 so that the frame 24 is suspended by the gimbal mechanism 26. Since the frame 24 is suspended from the gimbal mechanism 26, the frame 24 pivots about the X and Y axes via the pivots 54, 56, respectively. The angular orientation of the frame 24 with respect to the X and Y axes, and hence the laser beam 32, is dependent on the orientation of the first portion 26A with respect to the second portion 26B of the gimbal mechanism 26, and the orientation of the frame 24 with respect to the first portion 26A of the gimbal mechanism 26, respectively.

The first positioning device 28 is coupled to the first and second portions 26A, 26B of the gimbal mechanism 26. The first positioning device 28 includes a first motor 57, a first gear 58, a second gear 60, and a first shaft 62. The second gear 60 is coupled to the first portion 26A of the gimbal mechanism 26 using conventional fasteners (not shown) while the first shaft 62 is coupled to the second gear 60 and the second portion 26B through the first axis pivot 54. The first shaft 62 rotates within the first axis pivot 54 so that as the second gear 60 rotates, the first portion 26A of the gimbal mechanism 26 rotates with respect to the second portion 26B of the gimbal mechanism 26. The first gear 58 is coupled to a shaft 57A of the first motor 57. The teeth on the first gear 58 correspond to and engage the teeth on the second gear 60 such that as the first motor 57 rotates the first gear 58, the second gear 60 rotates which effectuates rotation of the first portion 26A of the gimbal mechanism 26, and hence the frame 24, with respect to the second portion 26B of the gimbal mechanism 26. Accordingly, the angle of the frame 24 and the laser beam 32 with respect to the X-axis is adjusted.

The second positioning device 30 is coupled to the first portion 26A of the gimbal mechanism 26 and the frame 24. The second positioning device 30 includes a second motor 64, a third gear 66, a fourth gear 68, and a second shaft 70. The fourth gear 68 is coupled to the frame 24 through conventional fasteners (not shown) while the second shaft 70 is coupled to the fourth gear 68 and the first portion 26A of the gimbal mechanism 26 through the second axis pivot 56. The second shaft 70 rotates within the second axis pivot 56 so that as the third gear 66 rotates, the frame 24 rotates with respect to the first portion 26A of the gimbal mechanism 26. The third gear 66 is coupled to a shaft 64A of the motor 64. The teeth on the third gear 66 correspond to and engage the teeth on the fourth gear 68 such that as the second motor 64 rotates the third gear 66, the fourth gear 68 rotates which effectuates rotation of the frame 24. Accordingly, the angle of the frame 24 and the laser beam 32 with respect to the Y-axis is adjusted.

It will be appreciated by those skilled in the art that other conventional gearing schemes may be used to effectuate a change in the angular orientation of the frame 24, and hence the laser beam 32 with respect to the X and Y axes. It will be further appreciated by those skilled in the art that belt drive systems or direct drive systems may be used to effectuate a change in the angular orientation of the frame 24, and hence the laser beam 32 with respect to the X and Y axes. It will be even further appreciated by those skilled in the art that other positioning devices may be used to effectuate a change in the angular orientation of the frame 24, and hence the laser beam 32 with respect to the X and Y axes.

The projection arrangement 14 also includes a first level vial 80 and a second level vial 82. The first and second level vials 80 and 82 are coupled to the frame 24. The first level vial 80 is positioned so that it senses the angular orientation of the frame 24 relative to the X-axis while the second level vial 82 is positioned so that it senses the angular orientation of the frame 24 relative to the Y-axis. The first and second level vials 80 and 82 provide outputs representative of the respective angular orientations of the vials. The first and second level vials 80 and 82 provide first and second electrical signals, respectively, representative of the angular orientation of the frame 24 with respect to the X and Y axes, respectively, and therefore indicative of the grades in the X and Y axes in which the laser light is being projected.

Other configurations may be used to sense and position the frame 24 relative to the X and Y axes. For example, the first and second level vials 80, 82 may be coupled to a separate mechanism that is coupled to and moves with respect to the frame 24. A grade mechanism in such an arrangement then causes the separate mechanism to carrying the level vials to shift so that it has a desired angular orientation with respect to the frame 24 and the X and Y axes. The positioning device 16 then adjusts the angular orientation of the frame 24 until the first and second level vials 80, 82 are level again. At this point, the frame 24 assumes the desired angular orientation with respect to the X and Y axes. Such an arrangement is shown in U.S. Pat. No. 4,062,634, issued Dec. 13, 1977, herein incorporated by reference. Another example is set forth in U.S. Pat. No. 5,852,493, issued to Monnin on Dec. 22, 1998, also herein incorporated by reference.

In the illustrated embodiment, the input device 15 comprises a keypad 84 and a display 86. The keypad 84 includes numeric keys for inputting a first desired slope for the rotating laser beam 32 along the X-axis and a second desired slope for the laser beam 32 along the Y-axis. The display 86 provides a visual indication of the inputted slope along the X and Y axes. It will be appreciated by those skilled in the art that the display 86 may be configured to display additional information as desired. It will be further appreciated by those skilled in the art that other input devices may be used to input the first and second slopes. For example, a pair of mechanical dials may be used to input the first and second slopes with the dials providing the visual indication of the inputted slopes directly. The input device 15 may be removably coupled to the laser transmitter 10 or fixed in position, as desired.

The input data from the input device 15, and the first and second level signals from the first and second level vials 80, 82, respectively are transmitted to the processor 19. The processor 19 is programmed to control the positioning device 16 so that the laser beam 32 forms a plane which is angularly oriented in a desired direction in response to the above signals.

Figure 2A:
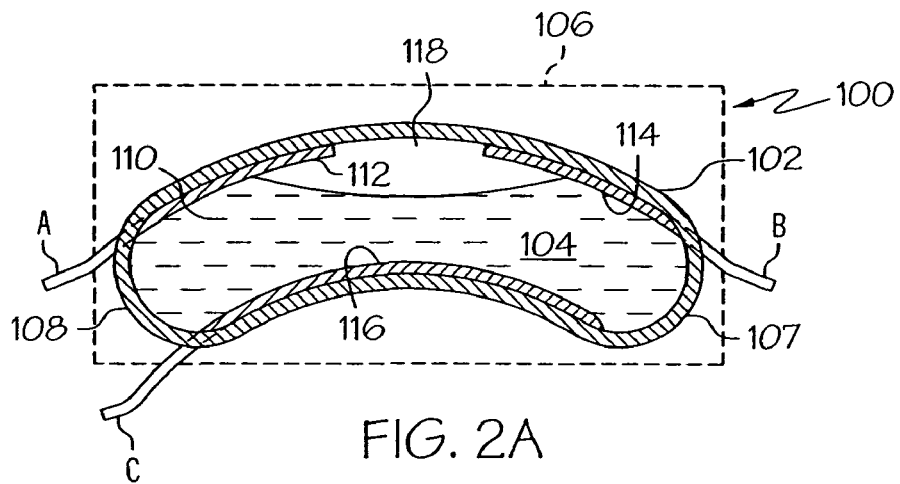
FIGS. 2A, 2B, and 2C are longitudinal sectional views of a level vial, illustrating the manner in which the vial is used to determine orientation.
Figure 2B:
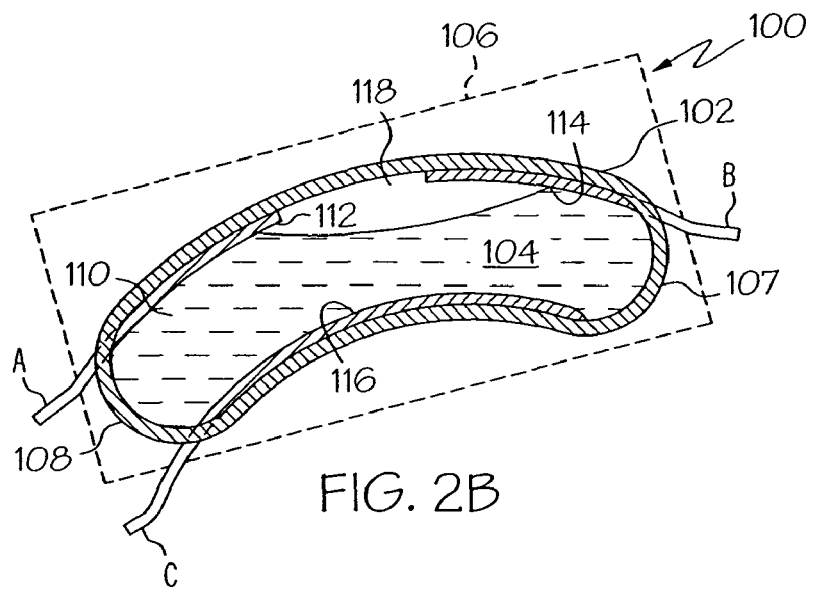
Figure 2C:
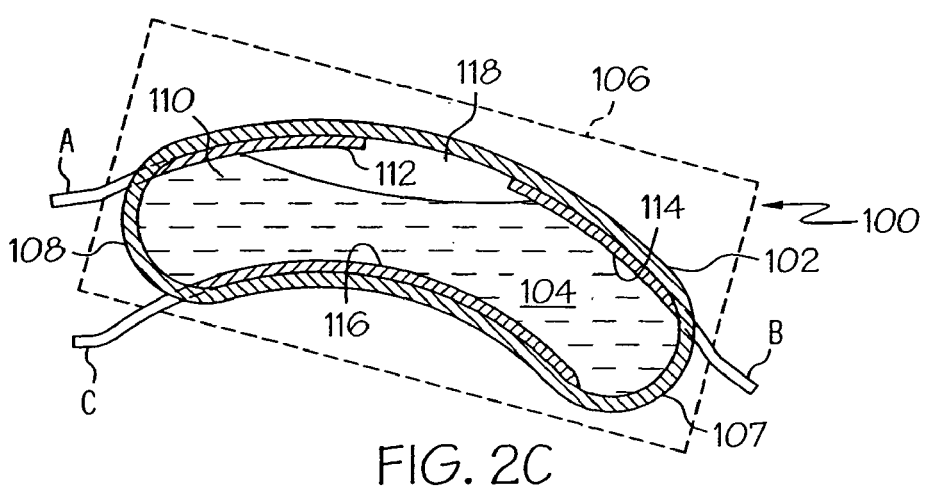

Reference is now made to FIGS. 2A, 2B, and 2C, which depict a level vial in greater detail. All three figures are sectional views taken in a longitudinally extending generally vertical plane. The exemplary level vial 100 provides an electrical signal indicating the orientation of the vial relative to gravity. In use on the transmitter, the electrical signal from the level vials indicates whether the laser light projected by the transmitter is oriented at the selected grade. The level vial 100 comprises an electrically nonconductive vial casing 102 defining an elongated chamber 104. The casing 102 is commonly made of glass, and is thermally insulated by means of an insulating layer, indicated at 106, which shields the vial from short term thermal fluctuations. The insulating layer, preferably a foam insulation layer, also insulates the vial 100 from the effects of thermal gradients that might otherwise distort the shape of the vial. The casing 102 curves generally downward toward opposite ends 107 and 108. A quantity of electrically conductive fluid 110 is provided in the chamber 104. The fluid may be any of a number of known, electrically conductive fluids which are commonly used in level vials. A quantity of air in the form of a bubble 118 is also provided in the chamber 104. A pair of end electrodes 112 and 114 electrically communicate with the upper portions of the chamber adjacent opposite ends 108 and 107, respectively, and extend toward the central portion of the chamber 104. A common electrode 116 electrically communicates with the lower portion of the chamber 104. Electrodes 112, 114, and 116 are electrically connected to electrical leads, labeled A, B, and C, respectively, which extend through the casing 102.

As indicated above, the vial 100 provides electrical signals which indicate the orientation of the vial. This electrical signals are a function of the resistances between leads A and C, and between leads B and C. The drawings depict only a single lead C as connected to electrode 116, although it is also common for level vials to include a pair of leads C emerging from both ends of the vial, connected to opposite ends of electrode 116. The resistance between leads A and C, ($R_{AC}$), substantially equals the resistance between leads B and C, ($R_{BC}$), when the vial is in a generally horizontal orientation, as illustrated in FIG. 2A. If the vial is pitched to the left, as shown in FIG. 2B, with end 108 lowered and end 106 raised, the air bubble 118 moves to the right. This results in more of the electrode 112 coming into contact with the electrically conductive fluid 110, and less of the electrode 114 contacting the electrically conductive fluid 110. It will be appreciated that this will cause $R_{AC}$ to decrease, and $R_{BC}$ to increase. Conversely, if the vial 100 is pitched to the right, as shown in FIG. 2C, with end 106 lowered and end 108 raised, the air bubble 118 moves to the left. This results in more of the electrode 114 coming into contact with the electrically conductive fluid 110, and less of the electrode 112 contacting the electrically conductive fluid 110. It will be appreciated that this will cause $R_{BC}$ to decrease, and $R_{AC}$ to increase.

It has been found that changes in the operating temperature of a laser transmitter such as shown in FIG. 1 produce errors in the direction of the beam of laser light produced by the transmitter. This is the result, at least in part, of thermally induced errors in the electrical signals from the level vials. It will be appreciated, for example, that a distortion of the shape of the casing 102 that occurs with a temperature change may well affect the relative areas of the electrodes 112 and 114 in contact with the fluid 110, thereby affecting the ratio of the resistances $R_{AC}$ and $R_{BC}$. It has been found that such thermally induced errors are repeatable with temperature change. The present invention therefore takes these errors into account, and does so based on the temperatures of the vials themselves. Because level vials are significant contributors to temperature induced errors, and because this invention contemplates using the vials to measure temperature, it is possible to compensate more accurately for the temperature than if another sensor arrangement were used.

Figure 3:
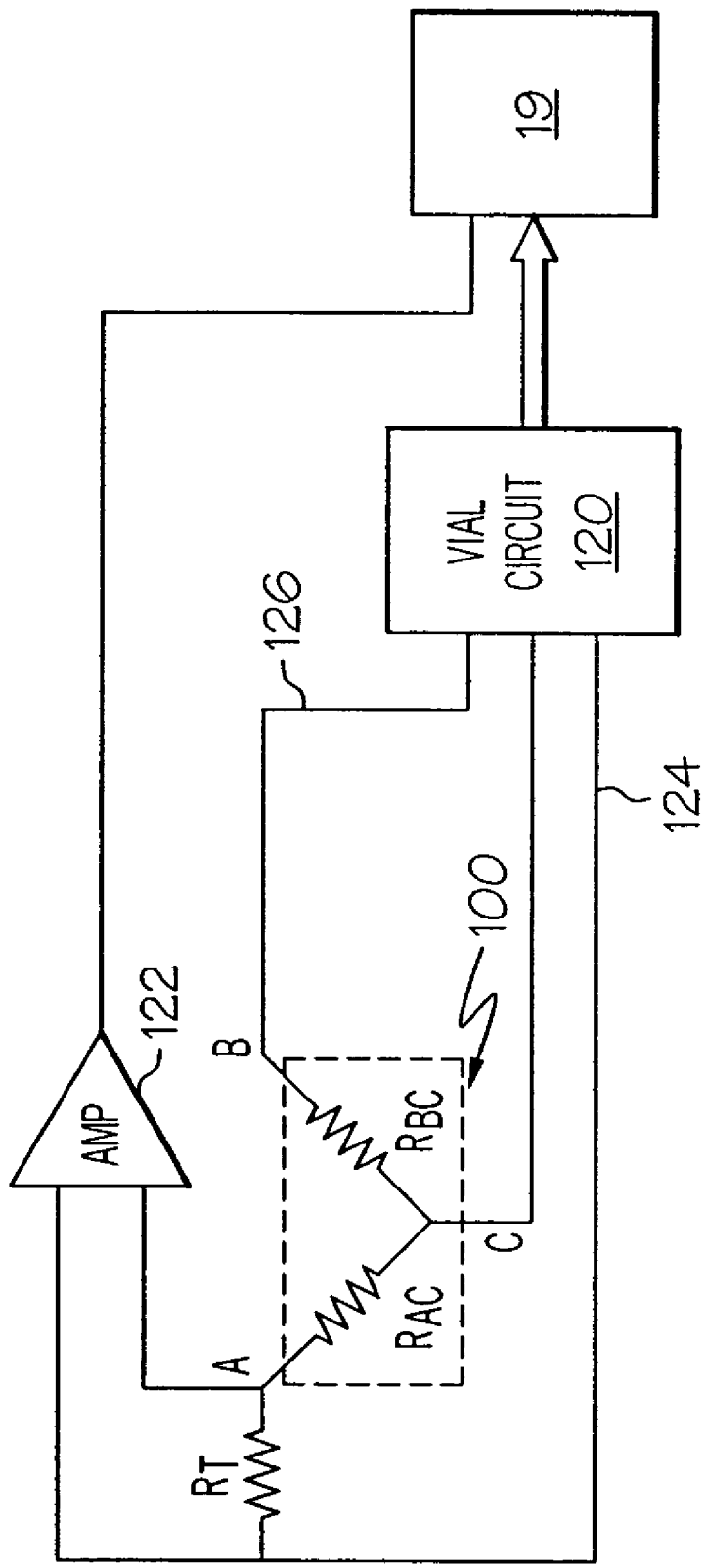
FIG. 3 is a schematic view of circuitry according to the present invention.

Reference is now made to FIG. 3 which illustrates a level vial 100 connected as a part of a transmitter constructed according to the present invention. The vial 100 has leads A, B, and C connected to a vial circuit 120 which monitors the relative values of resistances $R_{AC}$ and $R_{BC}$, thereby assessing the inclination of the vial 100. Resistances $R_{AC}$ and $R_{BC}$ are shown in FIG. 3 as discrete resistors for simplicity.

A temperature sensor for detecting the temperature of the vial includes a current sensor circuit comprising a test resistance $R_T$ and a test circuit, including amplifier 122. Periodically, vial circuit 120 applies a test signal of predetermined voltage and short duration across lines 124 and 126, and therefore across the end electrodes of the level vial 100. The current produced in response to this test voltage is directly proportional to the conductance of the series connected resistances $R_{AC}$, $R_{BC}$, and resistor $R_T$, and is inversely related to the bulk resistivity of the electrically conductive fluid in the vial 100. The value of resistor $R_T$ is small in comparison to the resistances $R_{AC}$ and $R_{BC}$. As a consequence, resistor $R_T$ does not significantly affect the operation of the balance of the circuitry. The current through the series connected resistances $R_{AC}$, $R_{BC}$, and resistor $R_T$ produced in response to the test voltage is an indication of the temperature of the vial 100, as it has been found that resistances $R_{AC}$ and $R_{BC}$ vary with the temperature of the vial 100. The voltage across resistor $R_T$ provides an indication of this current level. This voltage is amplified by amplifier 122 and an output signal applied to processor and temperature correction circuit 19. As described below in greater detail, processor 19 controls the operation of the transmitter such that temperature induced errors in the orientation of the beam of laser light are compensated. By this arrangement, the beam of laser light 43 is directed substantially at the selected grade.

Figure 4:
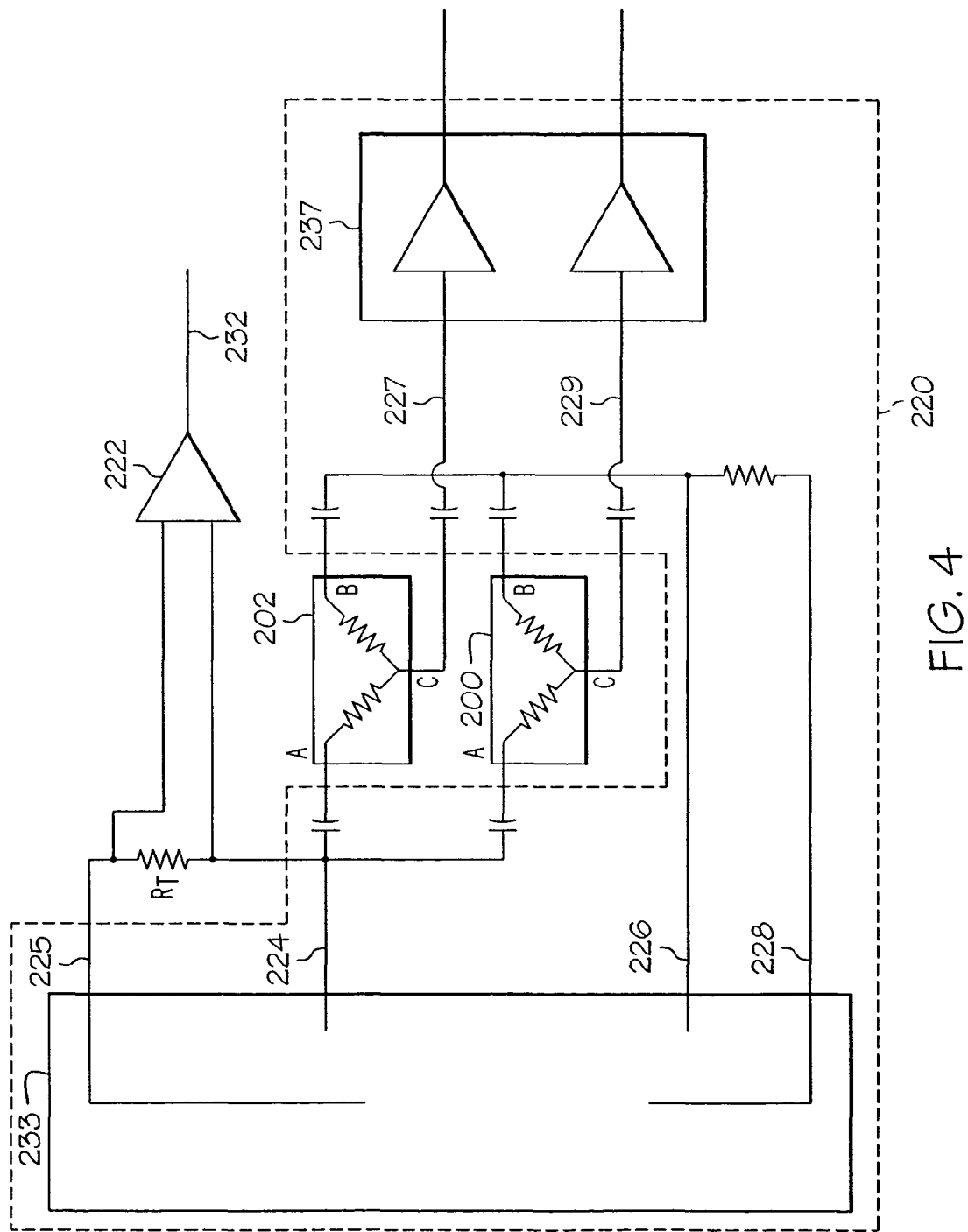
FIG. 4 is a schematic view of circuitry according to the present invention.

Reference is now made to FIG. 4 which shows a circuit arrangement for a pair of vials 200 and 202. The vial circuit 220 includes a vial drive circuit 233, level amplifiers 237, current sense resistor, $R_T$ and coupling capacitors. The coupling capacitors minimize direct current and resulting plating of the vial electrodes. Also shown is a current sense amplifier 222.

Outputs 227 and 229 are connected to the common electrode C of the vials 202 and 200, respectively, and kept separate. The voltages at the A leads of vials 202 and 200 are substantially equal to each other as are the voltages at the B leads of the two vials. Furthermore the voltage at the A leads is substantially opposite with respect to the system ground voltage compared to the voltage at the B leads. When $R_{AC}$ equals $R_{BC}$, the voltage at the C lead will be substantially equal to the system ground voltage. Signals on 227 and 229 are amplified indications of X axis and Y axis level errors. A vial is presumed to be level when its amplified signal is substantially equal to the system ground voltage.

Vial drive circuitry provides current at 225 and 228 such that the voltage between 224 and 226 is a predetermined level. Currents on 224, 226, 227, and 229 are kept to substantially zero, so that substantially all of the current that flows through the parallel combination of vials also flows through current sense resistor, $R_T$. Amplifier 222 measures the voltage across $R_T$ and provides that signal to the processor as an indication of current through the vials. This signal is also an indication of the bulk conductance of the two vials, which is an indication of the bulk conductance of the electrolyte in the vials and the size of the bubble and, finally, an indication of the temperature of the vials. It will be appreciated by those skilled in the art that circuits other than that described here could be employed to measure the bulk conductance of the vials. Referring back to FIG. 1, as described below in greater detail, processor 19 controls the operation of the transmitter such that temperature induced errors in the orientation of the beam of laser light are compensated. By this arrangement, the beam of laser light 43 is directed substantially at the selected grade.

As discussed previously with regard to FIG. 1, the transmitter 10 includes an arrangement for changing the direction of the beam until the selected grade is reached, as indicated by the level vial electrical signal. This arrangement includes the optical assembly 20 having a frame 24 and a gimbal mechanism 26. The positioning device 16 comprises a first positioning device 28 and a second positioning device 30. Devices 28 and 30 tilt the projection arrangement, changing the beam direction until the grade selected with keyboard 84 is achieved. In the present invention, the processor 19 provides an offset grade value and corresponding vial temperature. This offset grade value is related to the thermally induced error, and provides a compensation for such error.

Preferably, this arrangement includes a look-up table that stores offset grade values and specific associated operating temperatures. It has been found that in some instances it is sufficiently accurate to measure the thermally induced errors at three temperatures—"cold," "medium," and "hot"—and to use a set of three offset grade values and corresponding vial temperatures. The specific offset grade values selected will vary from transmitter to transmitter, and are preferably empirically determined after the transmitter 10 is constructed and operational. The offset grade values and vial temperatures are stored in a look-up table having offset grade values associated with specific vial temperatures. The look-up table therefore has offset grade values that are unique to the specific transmitter and the specific level vials incorporated therein.

In operation, the processor 19 constantly monitors vial temperature and provides grade offsets appropriate for the vial temperature at the time. The processor calculates grade offset during operation by applying vial temperature at the time to a linear interpolation of grade offsets and vial temperatures in the look-up table.

In one version of the invention (FIG. 3), each of the level vials used in the transmitter will have its own associated current sensor and test resistor $R_T$ connected thereto and a separate test circuit for determining the voltage across the test resistance $R_T$ in response to the application of test signals of predetermined voltage. In another version of the invention (FIG. 4), the level vials are connected in parallel through appropriate switching circuitry during the brief, periodic testing of the temperatures for the two level vials, such that a single temperature for the two vials is detected.

It will be appreciated that since the error induced by temperature change varies from level vial to level vial, the grade offsets needed to correct for such errors will also vary from vial to vial. As a consequence, each set of grade offsets is unique, and is established by subjecting a transmitter and the level vials that are incorporated into the transmitter to a series of ambient temperatures and measuring the resulting induced errors in the direction of the beam in the corresponding axes. The method is begun by initially selecting a plurality of temperatures for which correction will be measured. The same number of temperatures will typically be used with all of the transmitters of a given model. It has been found that using only three temperatures is adequate to characterize some transmitter designs.

Figure 5:
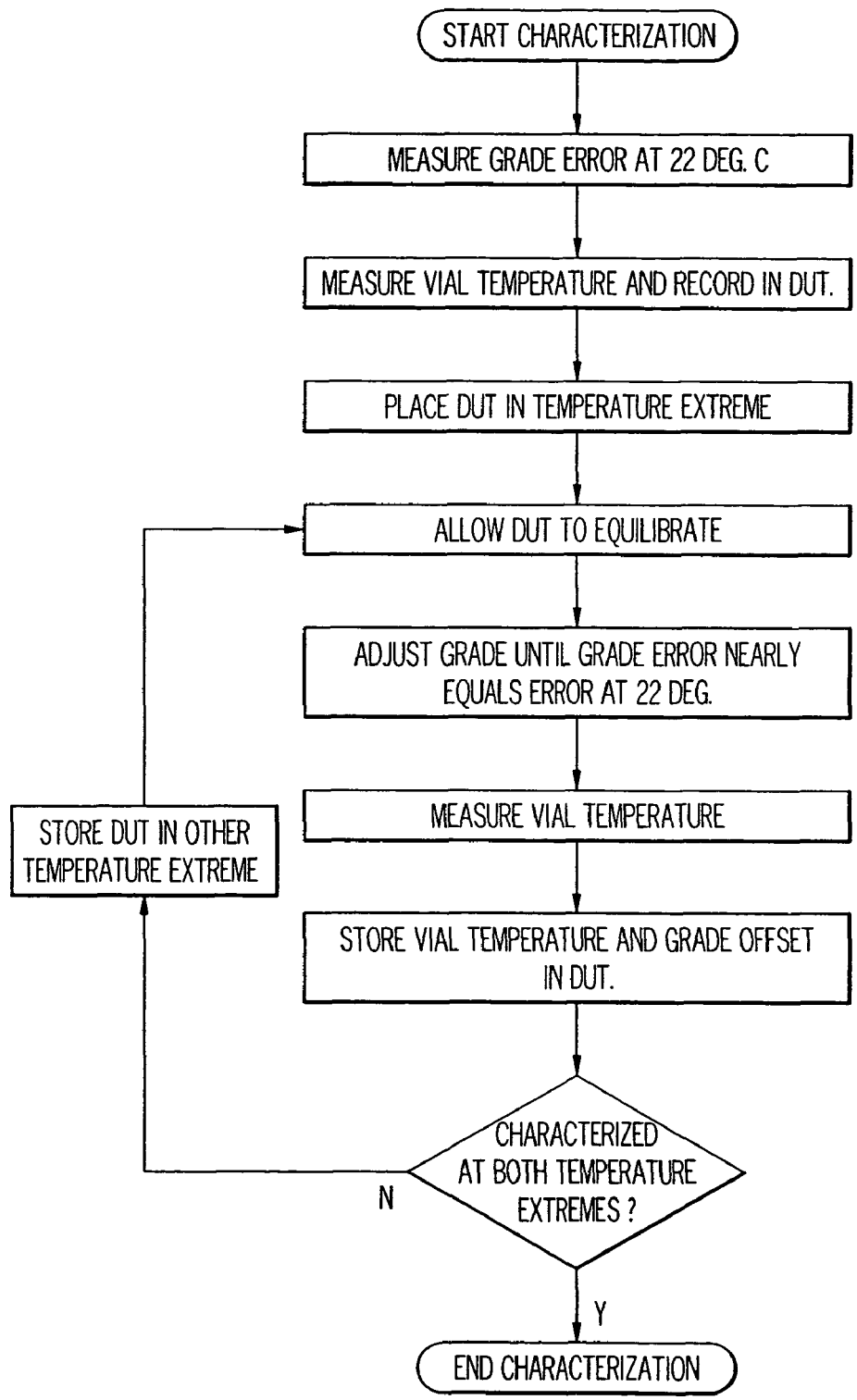
FIG. 5 is a flow chart useful in understand the method of calibration.

Next the transmitter is subjected to an ambient temperature at the first temperature for a period sufficient to achieve thermal equilibrium. Even though the level vials are thermally insulated, the vials will eventually reach ambient temperature. Next the transmitter is set at a specific grade for both axes, such as for example zero grade. The actual grade of the laser beam in each axis is then measured. By comparing the actual grades of the beam and the set, specific grades of the beam, the grade offsets needed to correct for the measured error are determined. The grade offsets are then stored in the look-up table with the vial temperature. Next, the transmitter is subjected to an ambient temperature at the second temperature for a period sufficient to achieve thermal equilibrium. The grade off-sets and vial temperatures are then measured and stored, as described above. These steps are repeated for each of the other temperatures until the look-up tables are completed. The method described for a device under test (DUT) is illustrated by the flow chart of FIG. 5.

Figure 6:
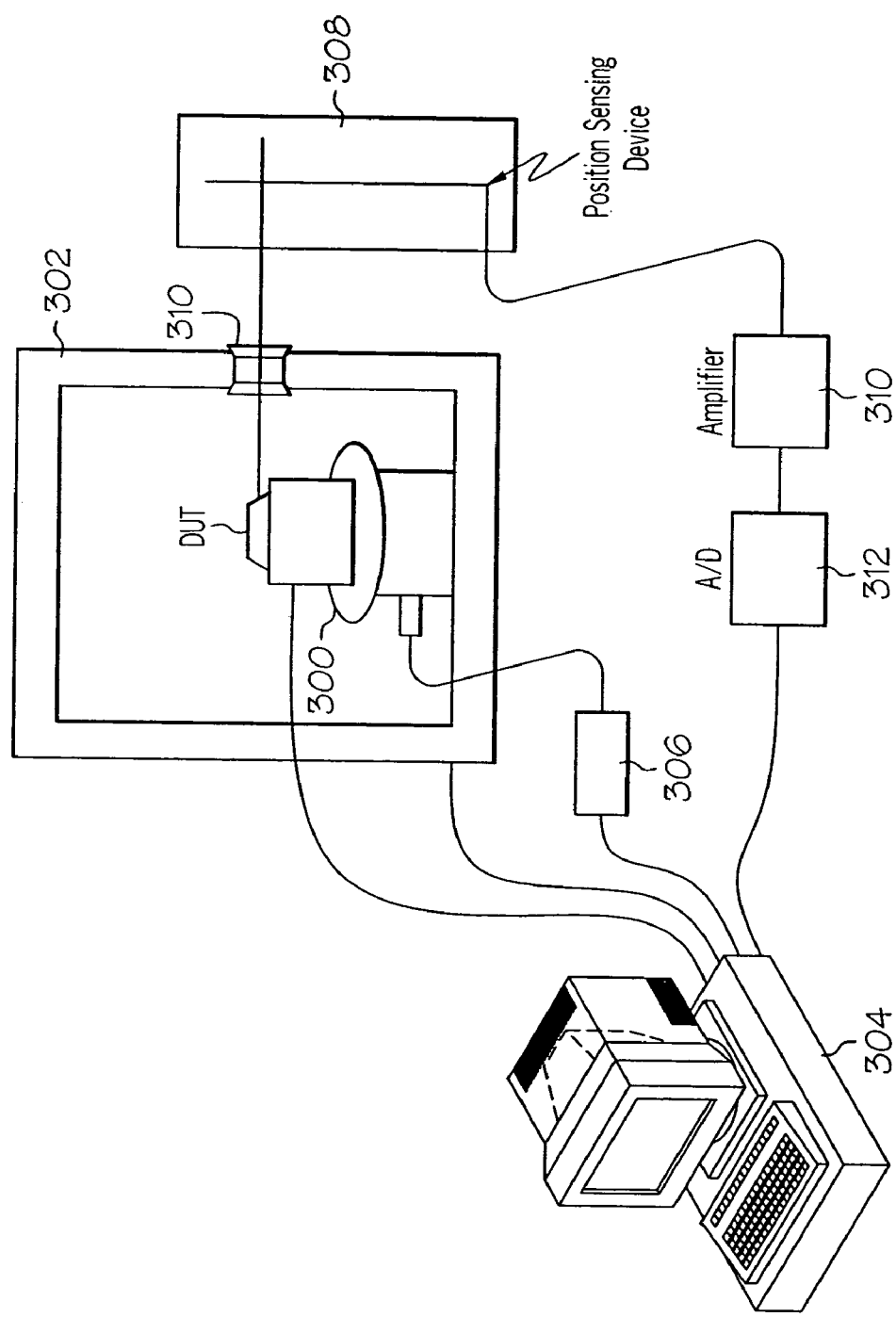
FIG. 6 is a diagrammatic representation of a test arrangement for carrying out the method.

FIG. 6 is a schematic representation of the test arrangement for carrying out this method. The DUT is placed on a motorized rotary table 300 inside a temperature chamber 302. A computer 304 controls the temperature setting of the temperature chamber 302. Computer 304 sends command signals to a motor controller 306 which turns the rotary table 300 and the DUT so that both axes can be readily measured with one optical angle measurement device 308. The beam from the DUT passes through a window 310 in the wall of the chamber 302 to the optical angle measurement device 308. The optical measurement device includes a beam detector which is connected an amplifier 310 and analog-to-digital converter 312 converter 312 is connected to the computer 30. By this method, the computer can monitor the grade error of the DUT.

Having described the invention in detail and by reference to preferred embodiments thereof, it will be apparent that modifications and variations are possible without departing from the scope of the invention defined in the appended claims.

What is claimed is:

1. A transmitter for projecting a beam of laser light, comprising:
    a source of laser light;
    a projection arrangement for directing the laser light from said transmitter, said projection arrangement including a level vial;
    a temperature sensor circuit for detecting error induced by temperature change where said error is a function of vial temperature, by detecting the temperature of said level vial itself; and
    a temperature correction circuit, responsive to said temperature sensor circuit, that adjusts said projection arrangement to compensate the direction of the laser light as a result of said error detected by said temperature sensor circuit, and wherein said level vial has a vial casing, and said temperature sensor circuit is configured to detect errors caused by distortion in the shape of said vial casing due to temperature change.

2. The transmitter according to claim 1, wherein said temperature sensor circuit is configured to detect asymmetrical distortion in the shape of said vial casing due to temperature change.

3. A transmitter for projecting a beam of laser light, comprising:
    a source of laser light;
    a projection arrangement for directing the laser light from said transmitter, said projection arrangement including a level vial;
    a temperature sensor circuit for detecting error induced by temperature change where said error is a function of vial temperature, by detecting the temperature of said level vial itself; and
    a temperature correction circuit, responsive to said temperature sensor circuit, that adjusts said projection arrangement to compensate the direction of the laser light as a result of said error detected by said temperature sensor circuit, and wherein said level vial has a first lead, a second lead, and a common lead, wherein inclination of said level vial is detected by monitoring a first resistance between said first lead and said common lead, and a second resistance between said second lead and said common lead.

4. The transmitter according to claim 3, wherein said level vial contains a quantity of electrically conductive fluid therein, said electrically conductive fluid defining said first and second resistances.

5. The transmitter according to claim 3, wherein said temperature sensor circuit comprises a test circuit coupled to said first, second and common leads of said level vial, said test circuit configured to provide a test signal to said level vial and monitor said first and second resistances, said first and second resistances corresponding to the temperature of said level vial.

6. The transmitter according to claim 5, wherein said test signal is provided as a signal having a predetermined voltage and short duration.

7. The transmitter according to claim 5, wherein said temperature sensor circuit further comprises a test resistance in series with said first lead of said level vial, wherein the temperature of said level vial is determined based upon a current passing through said test resistance in response to said test signal.

8. The transmitter according to claim 7, wherein said current is determined by measuring the voltage across said test resistance in response to said test signal, and computing said current.

9. A transmitter for projecting a beam of laser light, comprising:
    a source of laser light;
    a projection arrangement for directing the laser light from said transmitter, said projection arrangement including first and second level vials, each of said first and second level vials having:
        a vial casing;
        a first lead;
        a second lead; and
        a common lead, wherein inclination is detected by monitoring a first resistance between said first lead and said common lead, and a second resistance between said second lead and said common lead;
    a temperature sensor circuit, connected to said first, second, and common leads of said first and second level vials, for detecting errors in reading said first and second level vial based upon the temperature of said first and second level vials themselves; and
    a temperature correction circuit, responsive to said temperature sensor circuit, that adjusts said projection arrangement to compensate the direction of the laser light as a result of said errors detected by said temperature sensor circuit.

10. The transmitter according to claim 9, wherein said temperature sensor circuit comprises:
    a level amplifier coupled to said common lead of both said first and second level vials;
    a test resistance in series with a parallel combination of said first lead of both of said first and second level vials;
    a drive circuit coupled to said test resistance and said second lead of both said first and second level vials; and
    a current sensing amplifier across said test resistance.

11. The transmitter according to claim 10, wherein said drive device provides a first voltage applied to said first leads of said first and second level vials that is generally equal in magnitude, and opposite in polarity to a second voltage applied to said second leads of said first and second level vials.

12. The transmitter according to claim 10, wherein an output of said current sensing amplifier is provided to a processor as an indication the current through said first and second level vials where the current represents an indication of the temperature of the first and second level vials.

13. A transmitter for projecting a beam of laser light, comprising:
    a source of laser light;
    a projection arrangement for directing the laser light from said transmitter, said projection arrangement including a level vial having a quantity of fluid therein;

a temperature sensor circuit for detecting the resistance of said quantity of fluid in said level vial, said resistance being related to the temperature of said level vial; and a temperature correction circuit, responsive to said temperature sensor circuit, for adjusting said projection arrangement to compensate for errors in the direction of the laser light as a result of temperature induced variation in said level vial, and wherein said temperature sensor circuit comprises:

a test resistance in series with said conductive fluid in said level vial;

a source configured to provide a test signal between said test resistance and said conductive fluid in said level vial; and a detector for detecting the voltage across said test resistance, wherein the temperature of said level vial is determined by a computation of the current through said test resistance based upon the voltage across said test resistance, and a correlation of the computed current to a temperature.

14. The transmitter according to claim 13, wherein said test signal is applied periodically and is of a predetermined voltage and short duration.

15. A transmitter for projecting a beam of laser light, comprising:

a source of laser light;

a projection arrangement for directing the laser light from said transmitter, said projection arrangement including a level vial having a quantity of fluid therein;

a temperature sensor circuit for detecting the resistance of said quantity of fluid in said level vial, said resistance being related to the temperature of said level vial; and a temperature correction circuit, responsive to said temperature sensor circuit, for adjusting said projection arrangement to compensate for errors in the direction of the laser light as a result of temperature induced variation in said level vial, and wherein the resistance of said electrically conductive fluid that is detected by said temperature sensor circuit characterizes distortion in the shape of a vial casing of said level vial as a result of temperature.

16. The transmitter according to claim 15, wherein the distortion in said vial casing is asymmetrical.

* * * * *